R. C. BARRIE, Jr.
Mechanical-Movement.
No. 226,592.    Patented April 20, 1880.
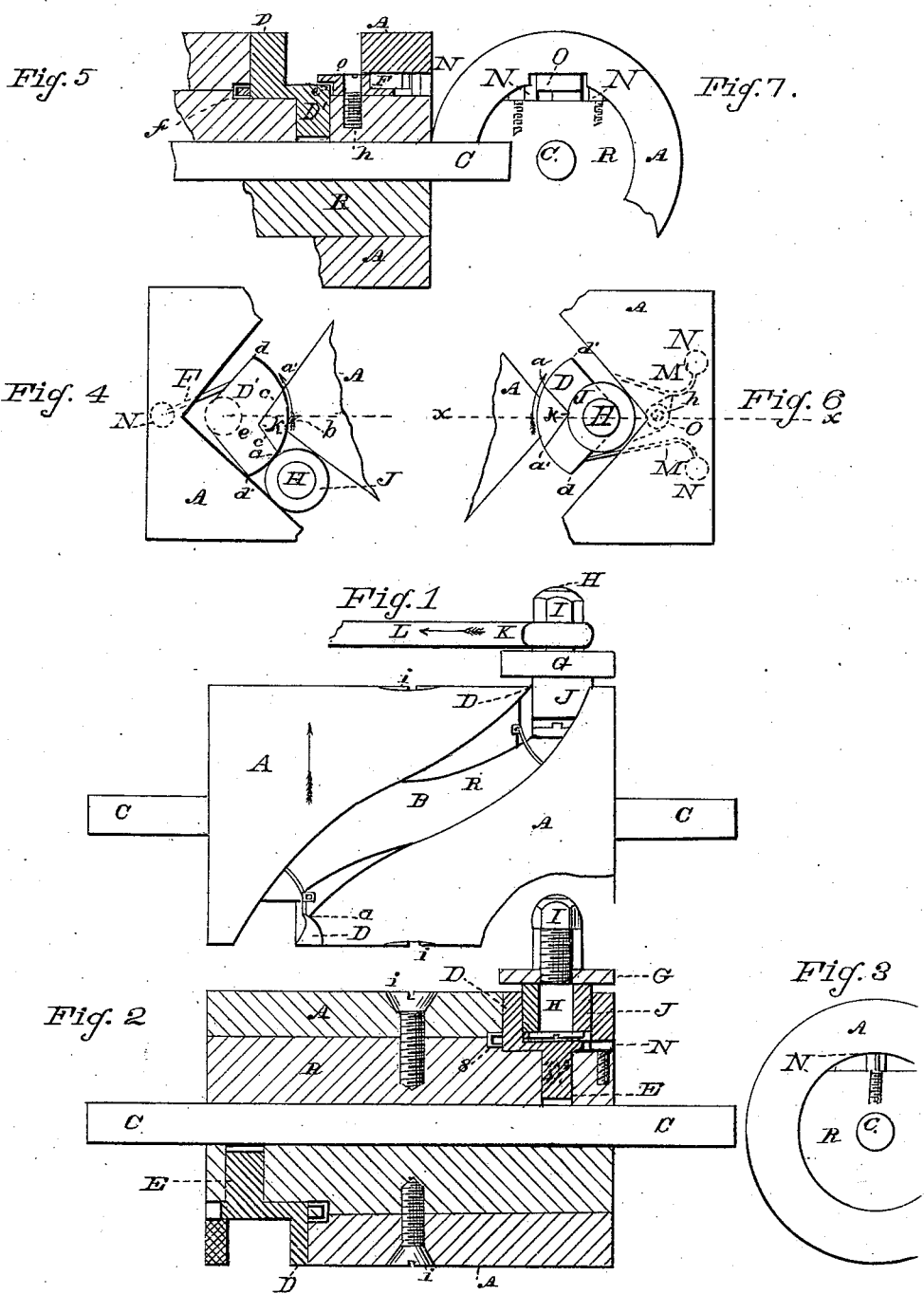
Witnesses
John Stearns
Jeremiah Curtin
Inventor
Robert C. Barrie Jr.

UNITED STATES PATENT OFFICE.

ROBERT C. BARRIE, JR., OF PHILADELPHIA, PENNSYLVANIA, ASSIGNOR OF ONE-HALF OF HIS RIGHT TO JOHN H. W. CHESTNUT, OF SAME PLACE.

MECHANICAL MOVEMENT.

SPECIFICATION forming part of Letters Patent No. 226,592, dated April 20, 1880.

Application filed February 3, 1880.

*To all whom it may concern:*

Be it known that I, ROBERT C. BARRIE, Jr., of the city and county of Philadelphia, State of Pennsylvania, have invented a certain new and useful Mechanical Movement by which a reciprocating motion is converted into rotary motion.

This invention relates to the class of mechanical movements that are adapted to convert longitudinal into rotary motion by means of a slot or groove having angular points, by which the motion is reversed for the purpose of continuing the same; and it essentially consists of certain devices by which the lines of resistance of the said angular points are made unstable, thus presenting a continuous surface or inclined plane.

It also consists of other devices by which it is made to work or act in either direction, as will hereinafter more fully appear.

Figure 1 is a side elevation, showing what I term "oscillating bearing-points" D D, the stud H, anti-friction roller J, a grooved cylinder, A, the movable cross-head or part G, a piston or connecting rod, L, groove B, and journals or bearings C C.

Fig. 2 is a vertical section of Fig. 1, showing the oscillating points D D, roller J, part G, the cylinder A, the flat surfaces on which the points D D are journaled, also the screws *i i*, which make the cylinder A rigid on the cylinder R, although both the said cylinders may be cast in one piece.

Fig. 3 shows the end view of the cylinders A and R, shaft C, and spring-fastening N.

Fig. 4 represents a plan view of my oscillating point D, arranged to act in a single direction. It shows the abutting points *d' d*, points *a' a*, angular surfaces *c c*, base *e*, convex surface *b*, cylinder A, roller J, stud H, the dotted lines showing the journal D', spring F, and fastening N, also point *k*.

Fig. 5 shows a section of Fig. 6 on the line *x x*. It shows the section of the cam or lever O, part of the spring F, its fastening N, and cam-stud *h*.

Fig. 6 represents the double-acting arrangement of the oscillating point D, showing the abutting points *d d'*, points *a a'*, roller J, stud H, cylinder A, dotted lines showing cam O, stud *h*, springs M M', fastenings N N, and cylinder A.

Fig. 7 is an end view of Fig. 5. It shows the cam O and spring-fastenings N N.

Operation: If the cross-head G be mounted on suitable guides and power applied to the rod L in the direction of the arrow K, and the cylinder A having suitable journals at C C, the point *k* being removed from the line of resistance, as seen in Fig. 4, it is evident that rotary motion will be imparted to cylinder A. Again, if the cylinder A be allowed to slide on the shaft C, or both sliding upon suitable journals at C C, the part G being rigidly fixed and power applied to the cylinder A or shaft C alternately at either end, it will impart to the said cylinder and shaft a rectilineal reciprocating motion.

Fig. 4 shows the operation in detail of my oscillating point D. The roller J coming into contact with the point *a*, the oscillating point moves in the direction of the arrow, allowing the said roller to reach the end of the stroke, as seen in Fig. 6. The roller J and stud H being directly over the base *e*, Fig. 4, and on a central line common to both the pivot D' of the oscillating point D and stud H, the roller J being tangent to the point *k*, the said point is thrown back until the abutting point *d'* reaches the position as seen at Fig. 4. The point *k* being removed from a direct line of resistance, it presents an unbroken continuation of the acting inclined or inner surface of the groove B, the convex surface *b* working in a corresponding concave surface in the cylinder A; or by changing the position of the stud H from its present position, as already shown, to a point upon the circumference of the cylinder A equal to an arc of ninety degrees, it will be evident that the oscillating bearing-point will pass the stud H and return to its normal position by what is termed "the force of gravitation." Fig. 6 shows the reversible devices by which it is made to act in either direction. The roller J and stud H having reached the end of the stroke in the manner described in Fig. 4, it has struck the point of cam O that projects over the base *e*, Fig. 5, and has carried it to the position show by dotted lines, Fig. 6. The opposite end is thus made to strike the spring M', when the spring M returns the abutting point d' to the position seen in Fig. 4, retaining it there until, on its return stroke, the stud H has passed the point a', Fig. 4, when, both springs being released, they meet each other's tension and return the movable point k and cam O on the line x x, Fig. 6. The same operation is made on the reverse stroke.

I am aware that it is not new to convert longitudinal into rotary motion by means of grooved cylinders. Therefore I do not claim such, broadly; nor do I wish to confine myself to the exact construction shown and described, as many devices and equivalents may be substituted therefor without departing from the spirit of my invention. Therefore

What I claim, and wish to secure by Letters Patent, is—

1. In a mechanical movement, the oscillating bearing-point D, having abutting points d d', surface-bearings c c, points a a', point k, convex bearing b, and pivot D', in combination with the stud H and roller J, the said point D oscillating on a central line common to its pivot D' and the center of the stud H, thus retaining the point k tangent with the roller J in the oscillating movement of the point D, all arranged to operate in the manner herein shown and described.

2. In a mechanical movement, the combination of the oscillating bearing-point D, having abutting points d d', the said points working against the inner surface of the groove B, whereby the oscillating movement of the point D is arrested while passing the stud H, also the concave surface b, working in a corresponding convex surface of the cylinder A, thus forming an unbroken continuation of the inner surface of the groove B, also the roller J, stud H, springs F, or their equivalents, as herein described, and the cylinder A, all arranged to operate together in the manner herein shown and described.

3. In a mechanical movement, the combination of the oscillating bearing-point D, abutting points d d', bearing-surfaces c c, convex surface b, pivot D', and projection 8 with the shaft C, cylinder A, stud H, and an ordinary cross-head or part, G, all operating together in the manner herein shown and described.

4. In a mechanical movement, the oscillating bearing-point D, abutting points d d', bearing-surface c c, convex surface b, pivot D', points a a', the cam or lever O, cam-stud h, springs M M', in combination with the cylinder A, stud H, and cross-head or part G, all operating together in the manner as herein shown and described.

ROBERT C. BARRIE, JR.

Witnesses:
JOSEPH MERCER,
J. H. W. CHESTNUT.